(12) United States Patent
Higbee et al.

(10) Patent No.: US 6,651,814 B2
(45) Date of Patent: Nov. 25, 2003

(54) CARRIER FOR COILED FILAMENTS

(75) Inventors: Thomas A. Higbee, Austin, TX (US); Martin G. Afflerbaugh, Austin, TX (US)

(73) Assignee: 3M Innovative Properties Company, St. Paul, MN (US)

(*) Notice: Subject to any disclaimer, the term of this patent is extended or adjusted under 35 U.S.C. 154(b) by 235 days.

(21) Appl. No.: 09/841,015

(22) Filed: Apr. 24, 2001

(65) Prior Publication Data

US 2002/0153268 A1 Oct. 24, 2002

(51) Int. Cl.⁷ .................................................. B65D 73/00
(52) U.S. Cl. ......................... 206/485; 206/388; 206/391
(58) Field of Search ................................. 206/388, 485, 206/391, 394, 564, 722, 726

(56) References Cited

U.S. PATENT DOCUMENTS

| | | | |
|---|---|---|---|
| 708,283 A | * | 9/1902 | Weeks |
| 5,152,395 A | * | 10/1992 | Cross ......................... 206/389 |
| 6,109,445 A | * | 8/2000 | Beyer ......................... 206/714 |

FOREIGN PATENT DOCUMENTS

| EP | 0967848 A2 | * | 12/1999 |
|---|---|---|---|
| EP | 0 967 848 a2 | | 12/1999 |

\* cited by examiner

*Primary Examiner*—Mickey Yu
*Assistant Examiner*—Troy Arnold
(74) *Attorney, Agent, or Firm*—Gregg H. Rosenblatt; Alan Ball (57) ABSTRACT

A carrier for coiled filaments comprises a longitudinal base having a first end including a reinforced edge, a second end, and a first ledge opposite a second ledge. There is a raised platform between the first ledge and the second ledge. The raised platform has a first row of projections extending above the raised platform adjacent to the first ledge of the base. A second row of projections extends above the platform adjacent to the second ledge of the base, in parallel relationship to the first row of projections. The raised platform accommodates a plurality of rectangular envelopes each sized to mount in overlapping relationship between the first row of projections and the second row of projections. Each envelope contains a filament so that the ends of the filament extend out of the envelope from openings in the corners of the envelope. A first rail of resilient material mounted on the first ledge includes a plurality of slits each to receive one end of a filament. The carrier includes a second rail of resilient material mounted on the second ledge. The second rail includes a plurality of slots each to receive the other end of a filament contained inside an envelope.

16 Claims, 8 Drawing Sheets

CARRIER FOR COILED FILAMENTS

FIELD OF THE INVENTION

The invention relates to protective packaging of filamentary material to prevent damage during transit and more particularly to a carrier for a plurality of protective envelopes each containing a filament in the form of a coiled optical fiber.

BACKGROUND OF THE INVENTION

Communication systems have for decades relied upon signal transmission using networks of cables containing copper wires. Arrival of the era of broadband transmission has produced a transition to optical fiber waveguides as the basic conduits of communication signals. Increasing use of optical fiber networks typically translates into increased demand for optical fiber and related products to satisfy expanding telecommunications systems, particularly those involving on-line access. This requires that product suppliers accelerate their output rate and assembly to deliver products and systems according to the demand. Although frequently overlooked, the design of packaging used for product delivery may facilitate the further processing of a product at a receiving location. Suitable integration of production operations between manufacturing facilities leads to efficiency in the processing of optical fiber and related devices intended for use in communications systems.

Optical fiber communication networks frequently include refractive index gratings, also known as optical fiber Bragg gratings. Bragg gratings perform a number of functions related to control and wavelength selection of light within an optical fiber. A common way to incorporate a Bragg grating into a communication line requires splicing or connecting an optical fiber Bragg grating into a section of an optical fiber line. The optical fiber Bragg grating is usually less than ten meters in length.

Optical fibers are predictably brittle since they have the properties of glass. Any device using glass as the primary material of construction requires careful handling during manufacturing and transportation. For this reason current methods for shipping optical fiber Bragg gratings rely upon individual shipping packages containing optical fiber coils wrapped around somewhat flexible cardstock in the shape of circular discs. Upon receipt, by a customer, each coiled optical fiber Bragg grating requires individual handling and testing, as needed prior to incorporating the device into e.g. an optoelectronic assembly.

Current forms of shipping packages do not take into account either the steps of manufacture of an optoelectronic assembly or the space available at a manufacturing station to accommodate a number of loose packages containing optical fiber coils. Consequently, inspection and manufacture of devices using refractive index gratings, such as Bragg gratings, has little compatibility with high volume processing of devices. For this reason, there is a need for packaging of filaments, exemplified by optical fiber Bragg gratings, to facilitate inspection and volume manufacture of assemblies containing these filamentary products.

SUMMARY OF THE INVENTION

The present invention provides a carrier for a plurality of individually coiled filaments each contained in a protective envelope. Materials used for filament carriers according to the present invention preferably have properties suitable for use in clean room environments. A carrier according to the present invention has a structure and size that may be varied for compatibility with inspection and processing of filamentary devices held and protected by the carrier. Preferably the filamentary devices are optical fiber devices particularly optical fiber Bragg gratings.

A filament carrier according to the present invention varies from a substantially planar structure having organizing projections protruding from its surface to a more complex rectangular carrier, having ends and sides, produced during molding of a plastic resin. The complex carrier structure may include an elevated platform having an upper surface, a first end, and a second end. A stepped ledge lies on each side of the raised platform. The platform includes a plurality of evenly spaced projections formed adjacent to each stepped ledge. This places a row of projections close to the ledges. The rows of projections are parallel to each other. Preferably there is a retaining rail on each stepped ledge between the side of the carrier and the raised platform. Retaining rails may be either applied to the carrier surface or be molded into the structure. The retaining rails have a parallel orientation with the rows of projections. In addition the carrier may include reinforcement molded into at least one end for increased rigidity.

The evenly spaced projections have a separation from each other that is wide enough to receive the corner of a rectangular envelope. Envelope size and shape may vary depending on the size of a coil of filament and the dimensions of a carrier according to the present invention.

An envelope holds and protects a coil of filament, which is preferably an optical fiber coil. A gap between the rows of projections is wide enough to allow a rectangular envelope to lie flat on the platform with diagonally opposite corners extending into the space between a pair of projections in each row. The evenly spaced projections represent multiple pairs of projections that provide space to retain envelope corners. This allows the carrier to act as a container for a plurality of overlapping envelopes, each containing a filament coil, preferably an optical fiber coil.

Each optical fiber coil includes pigtail ends extending in exposed fashion from diagonally opposed corners of an envelope. Placement of an envelope between projections, as previously described, directs the pigtail ends towards the retaining rails. The retaining rails contain gripping slits into which pigtail ends may be inserted to protect them from contact and inadvertent damage. With suitable position in the gripping slits, the pigtail ends may be made available for connection to monitoring equipment, such as a spectrum analyzer, when the filament coil, in the form of an optical fiber, contains a refractive index grating or Bragg grating. The need to monitor an optical fiber device, such as a Bragg grating, advantageously may use sufficient optical fiber connectors, on the surface of the carrier, to connect the number of fiber coil envelopes held by a carrier.

The size of the carrier may vary depending on the number of envelopes needed, or the amount of space that may be available at a manufacturing station during the assembly of optoelectronic systems that contain optical devices such as Bragg gratings. Regardless of the size or space available in a given carrier there is frequently a need to pre-screen optical fiber devices to evaluate their properties before installing them in costly optoelectronic systems.

A structure of several tiers of carriers may be used to increase the number of filament coils that may be transported in a single package. Using a footprint of 10 inches×14 inches for its base, a preferred carrier will hold up to thirty envelopes containing filament coils. Multiples of each set of thirty envelopes result from stacking carriers one on top of another. The present invention includes the formation of stacked carriers in a covered container.

A carrier for coiled filaments, according to the present invention may be referred to as a carrying tray comprising a substantially planar base having a longitudinal axis. The carrying tray includes a first row of projections having spaces between them so that the first row of projections extends above the substantially planar base parallel to its longitudinal axis. Similarly, a second row of projections having spaces between them extends above the base parallel to the first row of projections and the longitudinal axis of the carrying tray such that there is a separation between the first row of projections and the second row of projections.

The carrying tray may further include a first rail of resilient material and a second rail of resilient material mounted on the substantially planar base parallel to the first row of projections. In addition, the carrying tray may have a plurality of rectangular envelopes arranged on the substantially planar surface between the rows of projections. Each envelope includes a first corner opposite a second corner. Also, the plurality of envelopes has a size for mounting in overlapping relationship on the substantially planar base. In this arrangement, each of the first corners is located in a space of the first row of projections, and each of the second corners is located in a space of the second row of projections.

A carrier for at least one coiled filament, according to the present invention may comprise at least a first pair of spaced apart projections, and at least a second pair of spaced apart projections parallel to the at least a first pair of spaced apart projections. At least one envelope to contain a coil of filament is placed between the at least a first pair of projections and the at least a second pair of projections, The at least one envelope has corners sized for retention between the first pair and the second pair of projections. Opposing corners of each envelope may have at least one opening formed therein to allow ends of a filament to protrude from the at least one envelope. The carrier may further include a first rail of resilient material adjacent to the first pair of spaced apart projections and a second rail of resilient material adjacent to the second pair of spaced apart projections. The first rail includes retention slits and the second rail includes retention slots to receive ends of a filament protruding from the openings in the opposing corners of the at least one envelope. A rail may be made from polymeric elastomers, rubbers, and open or closed cell foams.

More particularly a carrier comprises a molded base having a longitudinal axis and including a first end having a reinforced edge, a second end, and a first ledge opposite a second ledge. A raised platform fills a width between the first ledge and the second ledge. There is a first row of projections, having spaces between them, extending above the raised platform adjacent to the first ledge of the base. A second row of projections, also having spaces between them, extends above the raised platform adjacent to the second ledge of the base, such that the second row has a parallel relationship to the first row of projections and the longitudinal axis of the base.

A plurality of rectangular envelopes each has an internal space for a filament and includes a first corner diagonally opposite a second corner. These first and second corners have openings formed in them to expose the ends of a filament extending from the corners. The plurality of envelopes has a common size to mount in overlapping relationship on the raised platform with each first corner located in a space of the first row of projections, and each second corner being located in a space of the second row of projections. A first rail of resilient material, mounted on the first ledge, includes a plurality of slits such that each slit receives an end of a coiled filament that extends from the opening of the first corner of each envelope, so that each slit retains an end of a coil of filament in the first rail. Similarly a second rail of resilient material, mounted on the second ledge, includes a plurality of slots, each to receive an end of a coiled filament, extending from an opening of the second corner of each envelope, so that each slot retains an end of a coil of filament in the second rail.

DEFINITIONS

The following definitions clarify the meaning of terms used to describe the present invention in its various forms and alternative embodiments.

As used herein the term "carrier" refers to packaging items preferably made of plastic and used to organize and hold a plurality of filaments, usually in the form of a coil. A carrier may include at least one plastic envelope.

The terms "polymer," "plastic," and "resin" may be used interchangeably herein for reference to materials suitable for forming carriers and envelopes according to the present invention.

The term "base" identifies a support component of a carrier. Preferably a base is molded by thermoforming, injection molding or other well known method for forming molded structures.

A "carrying tray" refers to a carrier without including an envelope.

The term "envelope" means a substantially flat container, preferably comprising a plastic film having a space to accommodate a filament between layers of film. Suitable films include those including cushioning air pockets or similar features to protect fragile filaments such as optical fibers.

A "projection" is a small post or rod-like element extending from the surface of a base or carrying tray. Projections according to the present invention may vary in cross sectional geometry. Possible cross sections include circular, triangular and square.

The term "resilient rail" refers to a pliable cushioning material that may be used to retain the ends of filaments, especially fragile filaments, particularly when the filament is an optical fiber. Preferably a resilient rail comprises an elastomer or polymeric structure attached to a base or carrying tray. Alternatively, a resilient rail may be a molded feature formed in a base during the molding of a base.

The terms "slit" and "slot" are synonymous and may be used interchangeably to refer to parts formed in resilient rails to retain ends of filaments within a resilient rail. A molded resilient rail may include slits/slots.

As used herein, the term "filament" refers to a thread-like structure that may be packaged in an envelope for shipping. A packaged filament may be in the form of a coiled filament but such form is not considered limiting. Preferably a filament according to the present invention is an optical fiber, particularly an optical fiber having a Bragg grating formed therein.

The term "recess" identifies part of a base or carrying tray that is suitably shaped to house a filament connector that provides attachment of filament ends to external systems and devices. Optical fibers, particularly optical fiber Bragg gratings, having connectors attached to their free ends may be connected to inspection equipment to confirm satisfactory conformance to requirements. The present invention preferably uses recesses for attachment of filament connectors to carriers. This is only one of several means for attaching filament connectors. Others, for example, may include adhesive attachment or the use of a class of interference connectors that includes hook and loop fasteners.

BRIEF DESCRIPTION OF THE DRAWINGS

Notwithstanding any other forms, which may fall within the scope of the present invention, preferred forms of the invention will now be described, by way of example only, with reference to the accompanying drawings in which.

DETAILED DESCRIPTION OF THE PREFERRED EMBODIMENTS

In its simplest form the present invention provides a carrier for envelopes containing filaments. Such a carrier includes a base having structural components for organizing a plurality of envelopes, preferably about thirty, for safe, damage-free transportation of the coils they contain.

Figure 1:
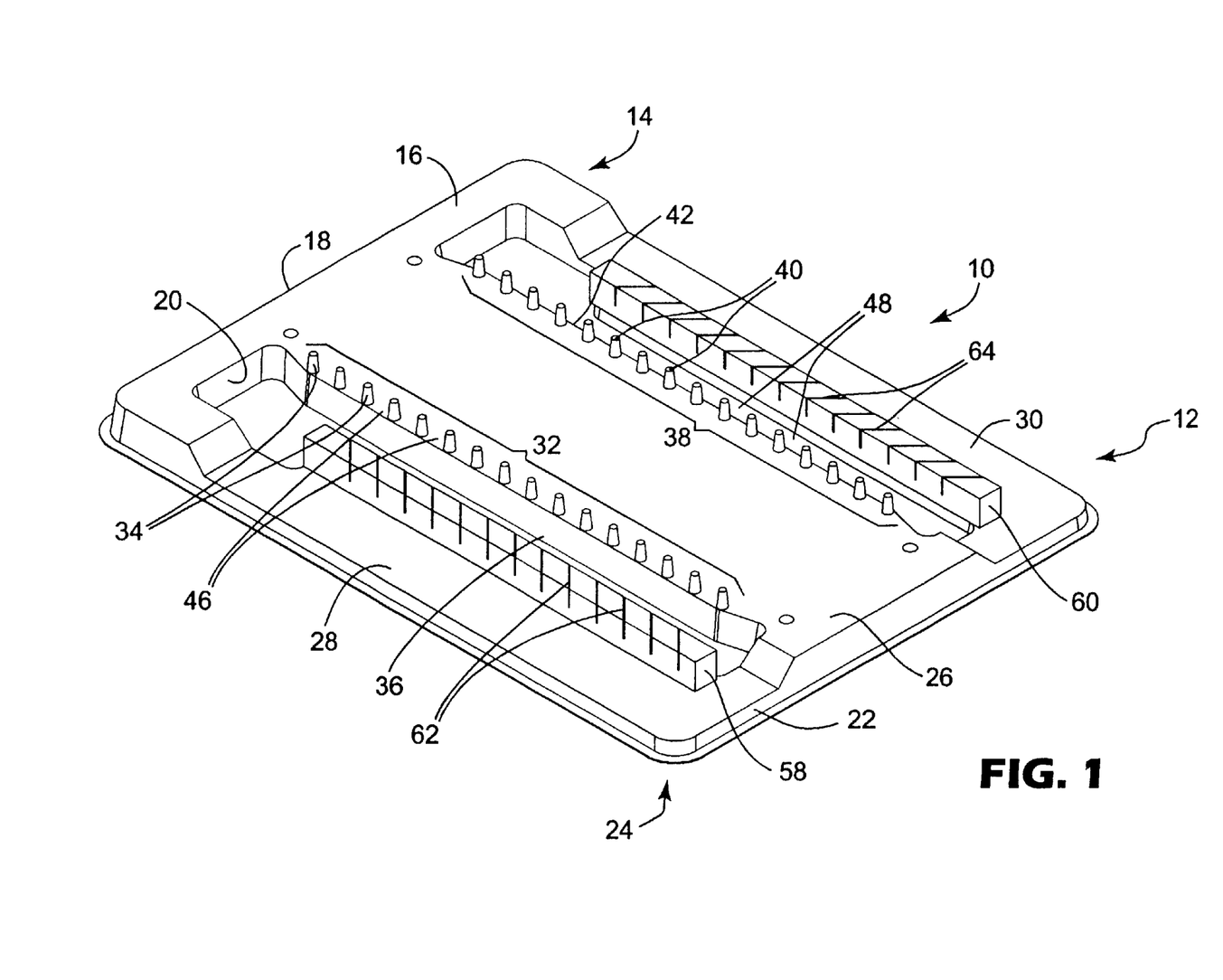
FIG. 1 is a perspective drawing of a carrier including spaced apart projections as retainers for envelopes.

Referring now to the drawings wherein like numbers refer to like parts throughout the several views, FIG. 1 is a perspective representation of a carrier 10 according to the present invention showing a substantially planar base member 12, preferably formed from a polymeric resin material using any of a variety of methods useful for forming molded polymeric structures. Suitable polymeric materials include polyvinyl chloride, polyethylene terephthalate, polyethylene terephthalate glycol, polystyrene, expanded polystyrene, polycarbonate polyethylene, and the like. The first end 14 of the carrier 10 includes a thickened, reinforcing portion 16 that has an external wall 18 and an internal wall 20. A wall 22, having less height than the external wall 18 and the internal wall 20 of the reinforcing portion 16, extends a substantial length of each side of the planar base member 12 and part of the end 24 opposite the reinforcing portion 16 of the carrier 10.

A raised platform 26 extends the length of the planar base member 12 from the reinforced end 16 to its opposite end 24. The raised platform 26 has a width that is less than the width dimension of the planar base member 12. This produces a first ledge 28 on one side of the raised platform 26 and a second ledge 30 on the other.

A first row 32 of spaced-apart projections 34 rise from the surface of the raised platform 26 close to the first boundary 36 between the raised platform 26 and the first ledge 28. Similarly, a second row 38 of spaced-apart projections 40 rise from the surface of the raised platform 26 close to the second boundary 42 between the raised platform and 26 the second ledge 30. This places the rows 32, 38 of projections 34, 40 essentially parallel to each other on opposite sides of the raised platform 26.

Figure 2:
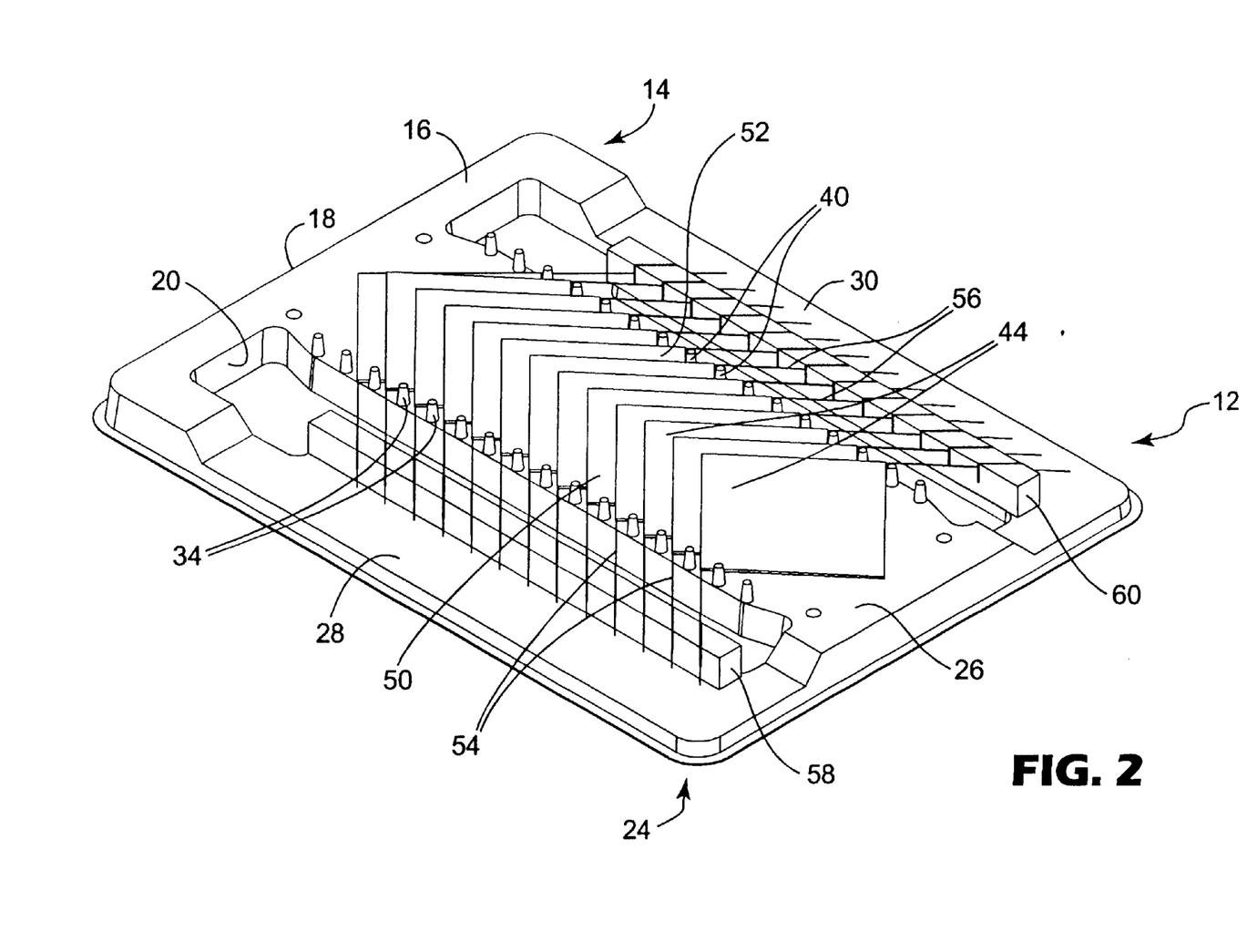
FIG. 2 provides a perspective view of a carrier according to the present invention having envelopes arranged along the surface of a raised platform.

FIG. 2 shows that the separation between rows 32, 38 allows mounting of substantially rectangular envelopes 44, preferably square envelopes, in an overlapping relationship on the surface of the raised platform 26. Spaces 46, 48 (see FIG. 1) between the projections 34, 40 provide sufficient room to insert diagonally opposing first 50 and second 52 corners between corresponding projections 34, 40 in the first 32 and second 38 rows of projections 34, 40. Suitable selection of the dimensions of the separation between rows 32, 38 of projections 34, 40 and the spaces 46, 48 between the projections 34, 40 allows the envelopes 44 to lie substantially flat on the surface of the raised platform 26. Confinement of the corners 50, 52 of the envelopes 44 between projections 34, 40 deters displacement of any of the envelopes 44 from the surface of the raised platform 26 unless it becomes tipped or inverted.

The envelopes 44 each have an internal space for containment of a filament (not shown). A number of rectangular envelopes 44 is arranged on the raised platform 26 to be substantially flat, one overlapping another with diagonally opposing corners 50, 52 of each envelope 44 extending into the spaces 46,48 between the projections 34, 40. Packing of each coil of filament in an envelope 44 allows one end 54 of a filament to protrude from a first corner 50 while the other end 56 of the filament protrudes from the second corner 52 of the envelope. The protruding ends 54, 56 of each filament extend over the sides of the raised platform 26 so that the one end 54 of the filament rests on a first rail 58 and the other end 56 of a filament rests on a second rail 60 of the carrier 10. Preferably the rails 58, 60 comprise a resilient material containing slits 62 to retain each of one end 54 of a plurality of filaments and slots 64 to retain each of the other ends 56 of a plurality of filaments (see FIG. 1). Filament ends 54, 56 held in the slits 62 of the first rail 58 and slots 64 of the second rail 60 further limit the movement of the envelopes 44. Also, exposed filament ends 54, 56 have a convenient orientation, in the resilient material, for attachment to monitoring equipment, especially when the filament is an optical fiber. The rails 58, 60 may be formed from any of a variety of materials including polymeric elastomers, rubbers, and open or closed cell foams and the like. Suitable materials may be selected from polyurethane, polystyrene, polyolefins and related copolymers and terpolymers.

An optical fiber that includes a Bragg grating may be monitored to determine the wavelength response of the Bragg grating using a spectrum analyzer detecting the wavelength of light passing through the grating from an outside light source. In one embodiment of the present invention, the spectrum analyzer may be attached to optical fiber ends 54, 56 using portable optical fiber connectors. Another embodiment includes attached connectors positioned on the first 28 and second 30 ledges close to where the fiber ends 54, 56 emerge from the resilient rails 58, 60 to provide a point for connection between optical fibers and an appropriate spectrum analyzer.

Figure 3:
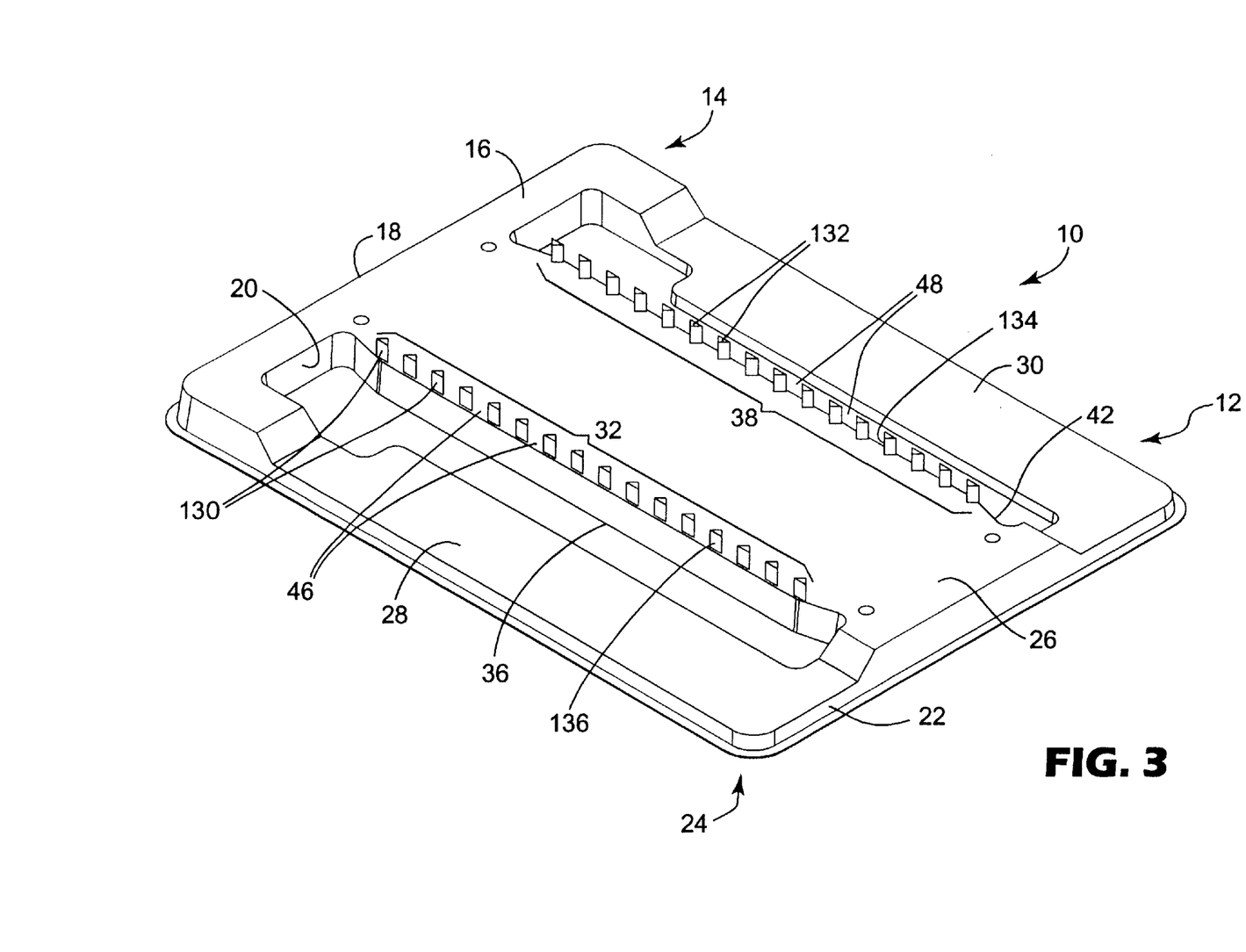
FIG. 3 shows a perspective view of a carrier according to the present invention including spaced apart projections having triangular cross section.
Figure 4:
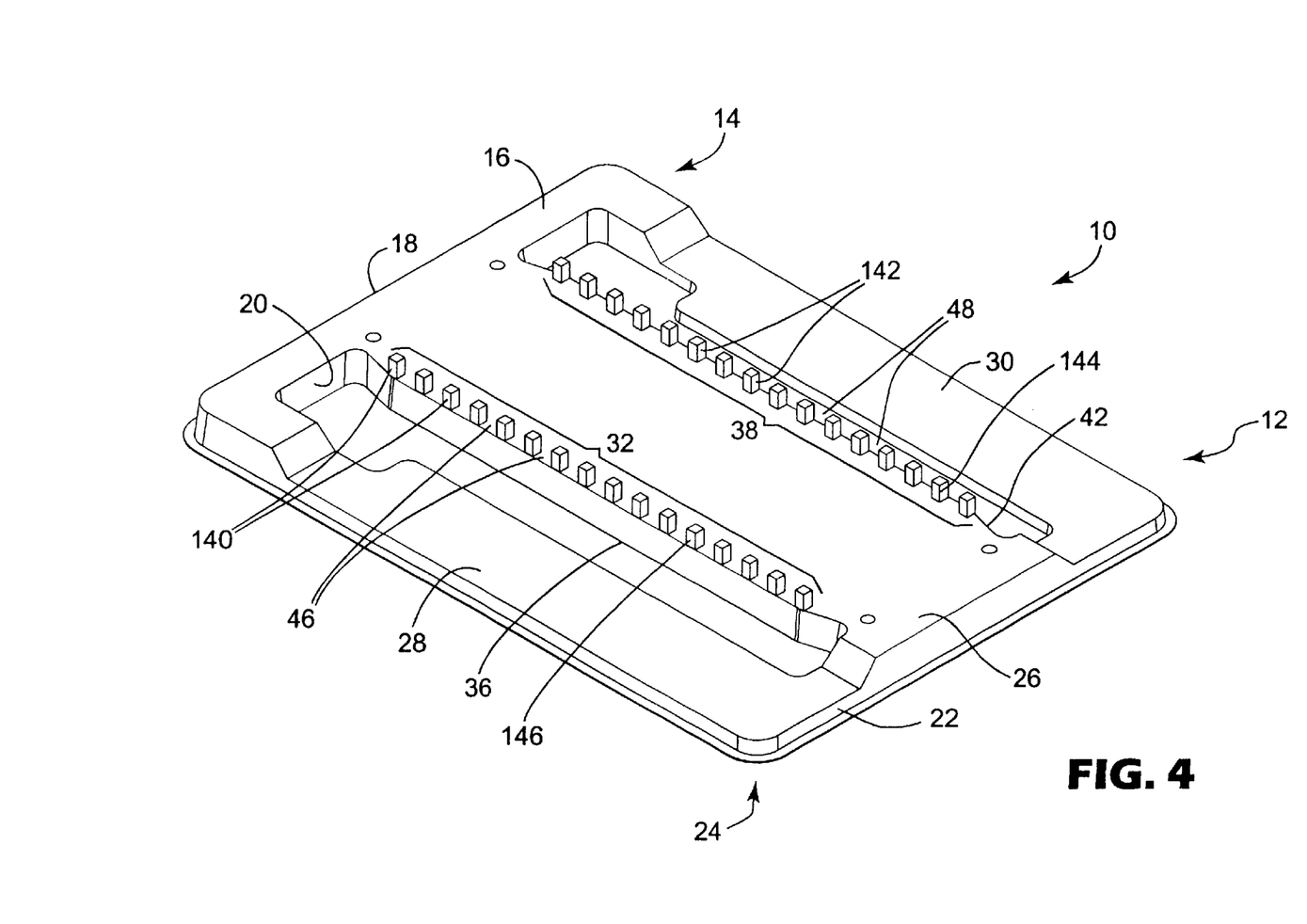
FIG. 4 shows a perspective view of a carrier according to the present invention including spaced apart projections having rectangular cross section.

Comparison of FIG. 1 with FIG. 3 and FIG. 4 reveals alternative geometry for projections of the rows 32, 38 along the sides of the raised platform 26. In FIG. 1, the projections 34, 40 have a circular cross section. Circular cross section is preferred, being relatively easy to mold. The projections 130, 132 in FIG. 3 have a triangular cross section while those 140, 142 in FIG. 4 have a square cross section. A further alternative produces two possible orientations for the triangular 130, 132 and square cross section 140, 142 projections. In either case, rotation of a projection 130, 132, 140, 142 may place either a corner 134, 144 of the projection or a planar face 136, 146 of the projection pointing towards the center of the raised platform 26.

Figure 5:
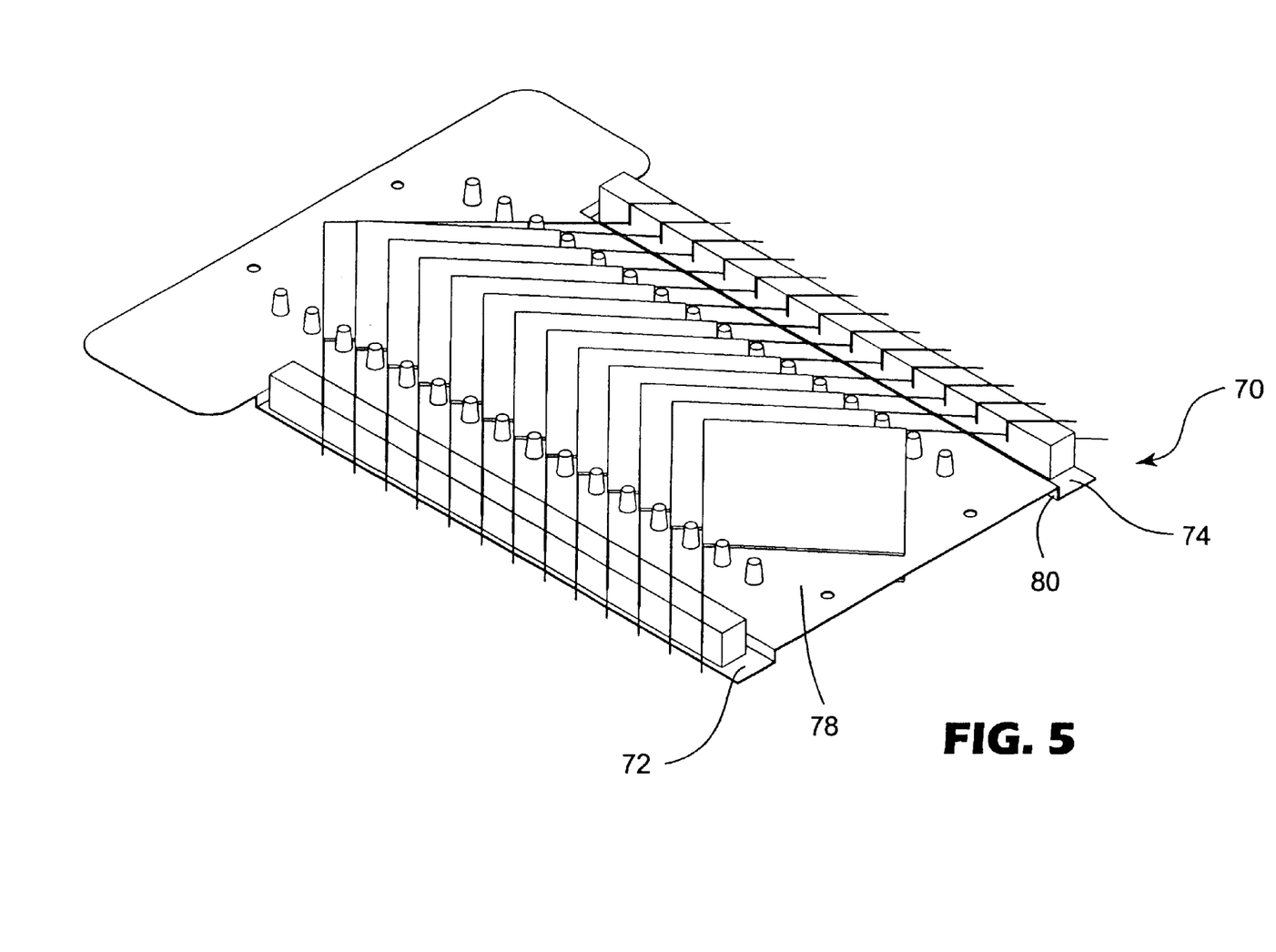
FIG. 5 shows a perspective drawing of an intermediary support used for forming a stacked arrangement having multiple layers of envelopes each containing a coiled filament.

FIG. 5 shows a moldable, essentially planar, intermediary support 70. The carrier 10, previously described, and the intermediary support 70 differ by omission, from the support 70, of a reinforcing portion 16. Also, a first flange 72 and a second flange 74 replace the first ledge 28 and second ledge 30 for mounting of the first 58 and second 60 rails.

Figure 6:
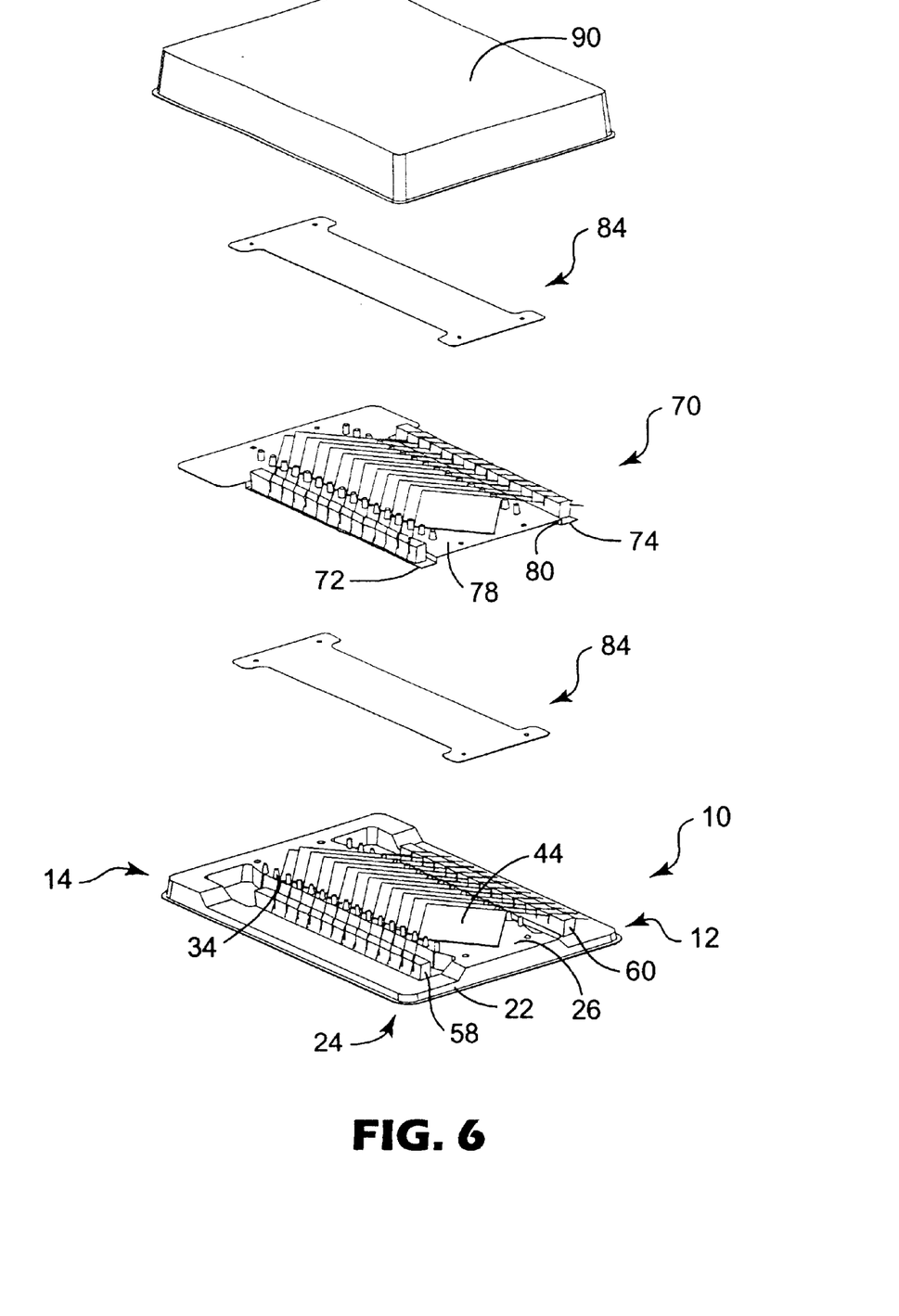
FIG. 6 shows an exploded perspective view of a container that includes a stacked arrangement of carriers according to the present invention.

FIG. 6 shows how placement of an intermediary support 70 on a carrier 10 would produce a stacked arrangement in which the first 72 and second 74 flanges rest on the first 58 and second 60 rails of the carrier 10. The support board 78 of the intermediary support 70 includes a step-down 80 to the flanges 72, 74 on either side of the support board 78. This step-down 80 indents the support board 78 from the flanges 72, 74 so that the support board 78 has clearance over the envelopes 44 on the carrier 10 and is stabilized by contact of the flanges 72, 74 with the first 58 and second 60 rails.

A flat retainer 84, inserted over the envelopes 44, provides protection of the envelopes 44 from inadvertent damage associated with the formation of the stacked arrangement. The stacked arrangement may be converted into a container for envelopes 44 containing coiled filaments by enclosing the stacked arrangement with a cover 90. A container according to the present invention may be held together by an interference fit between the lip of the cover 90 and the planar base member 12. Preferably the cover 90 grips the planar base 12 by contact with wall portions including the external wall 18 and the lower wall 22. Suitable sizing with variation in the height of a cover 90 produces a series of optional containers that carry increasing numbers of coiled filaments depending upon the number of intermediary supports 70 added above a carrier 10. Preferably a spacer in the form or a flat retainer 84 separates the upper levels of intermediary supports 70 from those immediately below. A container may also be a cover 90 placed over a single carrier 10 to provide a packaged carrier that may be shipped conveniently.

Containers according to the present invention provide re-usable transporters for envelopes 44 containing coiled filaments. As mentioned previously, the envelopes 44 are rectangular, preferably in the shape of a flat square, and fabricated from plastic film that may include air pockets or similar protective structure to prevent damage by impact or dropping. Preferably the protective structure does not increase the bulk of the individual packaging envelopes, since this could increase the bulk of a container for coiled filaments. Materials suitable for protective envelopes 44 include non-woven sheets, including e.g. paper, or metal foils, polymeric films and composite films that combine other forms of sheet or film, such as a polymer coated metal foil.

The overall size of a container may be subject to requirements of space available at an assembly station of a process for manufacturing e.g. optoelectronic devices. There may be no apparent limits to the dimensions of a carrier 10, or an intermediary support 70 or a container. However, as a practical issue manufacturing space may determine the maximum available "footprint" for any of these items, individually or in stacked arrangement. This requires the formation of containers for compatibility with manufacturing processes. Another issue of compatibility involves the assembly of optoelectronic devices under clean room conditions. There are specific requirements for materials that may be allowed inside a clean room facility. Consideration for these requirements led to selection of materials for carriers 10 intermediary supports 70 and containers known to be suitable for clean environments.

Figure 7:
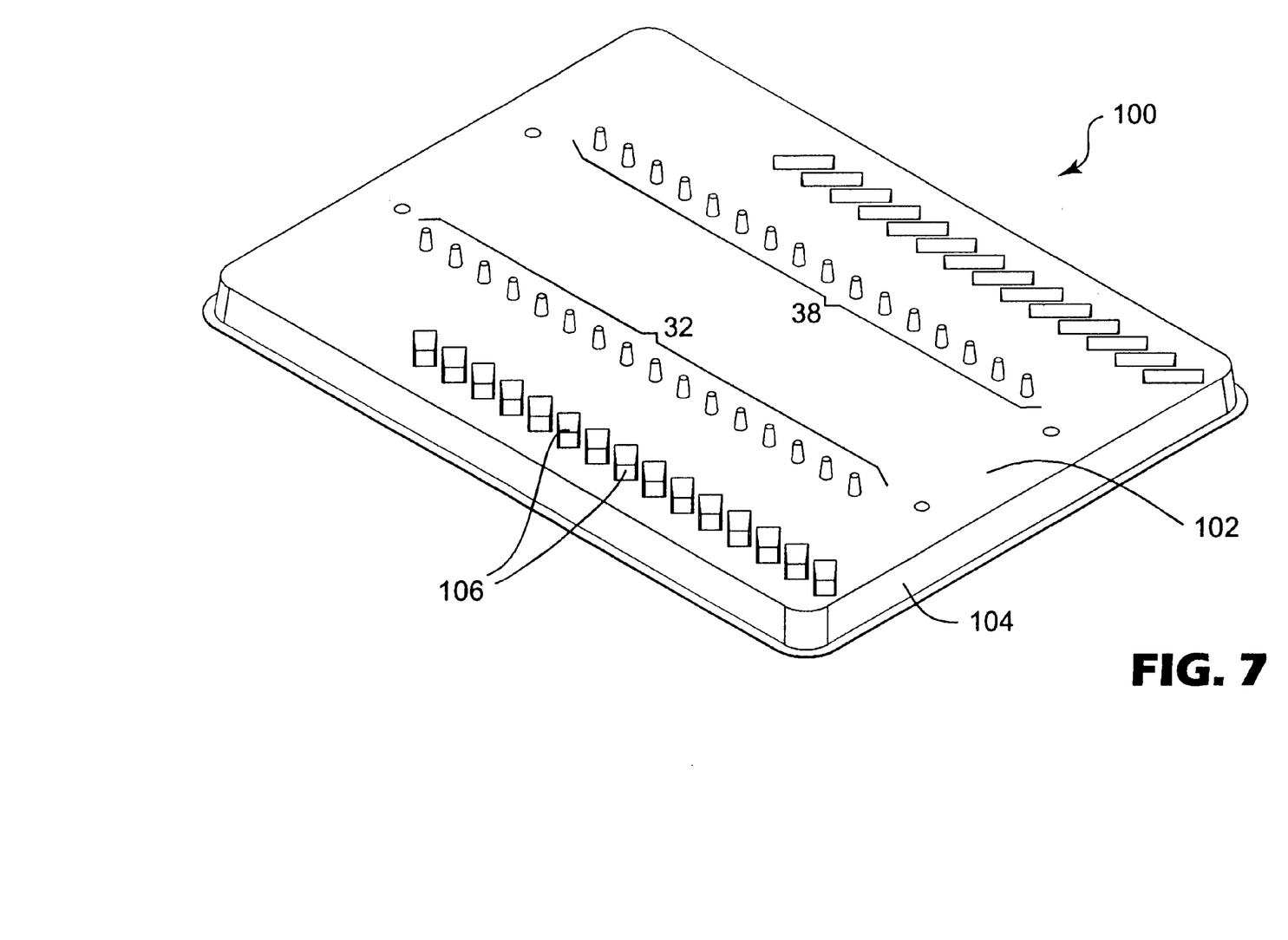
FIG. 7 is a perspective view of a carrier including pockets for optical fiber connectors used for terminating coiled optical fibers contained in protective envelopes.

FIG. 7 provides an alternative embodiment of a carrier 100 according to the present invention. In this case, the carrier is formed as an essentially planar structure including a base 102 formed integrally with a wall 104 extending downward from the sides and ends of the base 102, giving the appearance of an inverted rectangular pan. Towards its center, the base includes at least a pair of parallel rows 32, 38 of projections extending above the upper surface of the base 102. Adjacent to its sides, the base 102 includes angled recesses 106. The base 102 may comprise a plastic resin having projections and angled recesses 106 formed therein using any of a variety of known methods for molding plastic materials. Suitable methods include injection molding, reaction injection molding, casting, thermoforming and the like.

The structure of the alternative carrier 100 includes dimensions that place the projections in a suitable relationship for arranging a plurality of overlapping envelopes in a substantially flat configuration as described previously with respect to FIG. 2 and FIG. 6. As before, each envelope contains a coiled filament, preferably in the form of an optical fiber containing a Bragg grating. Ends of optical fibers, protruding from diagonal corners of each envelope, may be terminated using a suitable optical fiber connector. Preferably the optical fiber connectors have a size that matches the recesses 106 formed in a carrier 100 adjacent to each of its sides. Recesses 106 shown in FIG. 7 have internal walls substantially at right angles to the recess floor. Alternatively, recesses 100 may be formed to correspond to the shape of an optical fiber connector.

Connector terminated optical fiber ends may be readily attached to equipment for visual inspection. In the case of an optical fiber Bragg grating, the optical fiber connectors facilitate testing during thermal cycling of a grating that is monitored for wavelength performance by connection to a spectrum analyzer.

The height of the wall 104 formed integrally with the base may be selected to facilitate stacking of multiple carriers 100 without interference between the envelopes arranged on the upper surface of each base 102 and the lower surface of each succeeding base. A cover may be used to protect envelopes on the highest carrier in a stacked arrangement of carriers. Also, the carriers 100 and covers may be sized or shaped to develop a releasable connection between carriers during stacking. Sizing and shaping may include other features formed in the wall or base of a carrier. One such feature is a plurality of grooves or channels extending from the vicinity of the projections and opening into the recesses. Optical fiber ends protruding from the envelopes for connection to optical fiber connectors fit into the grooves for optimum alignment with the connectors while providing protection from inadvertent contact that could damage the protruding fiber ends. The use of optical fibers terminated with optical fiber connectors gives the opportunity for preliminary optical fiber inspection to reject optical fiber devices that may have been damaged during transit. This allows removal of non-conforming optical fibers before they become part of the costly process of e.g. optoelectronic device manufacture.

Either of the carrier structures 10, 100 described previously may be used for transporting a number of coiled filaments, using a single carrier or carriers in a stacked arrangement. A preferred carrier structure retains bare filament ends in resilient rails as described previously. Placement of connectors at the ends of each filament, when the filament is an optical fiber, provides a somewhat more expensive packaging of coiled optical fibers. This form, nevertheless, offers the benefit of previewing optical fiber characteristics to assure conformance to requirements. Each type of filament carrier according to the present invention offers a reusable carrying structure that may be designed for compatibility with manufacturing processes. After removal of filament containing envelopes, the carriers may be returned to the supplier for re-use. At this time there is no known, reusable carrier for coiled filaments, particularly coiled optical fibers.

A filament carrier has been described to show how a plurality of filaments in protective envelopes may be shipped to a destination where the filament carrier may be incorporated into a process that produces filament-containing products. Carriers according to the present invention are useful for transporting filaments in the form of optical fibers, especially optical fiber Bragg gratings used to make optoelectronic devices that may be included in telecommunications networks.

Envelopes 44 used for containment of filaments have been described as rectangular, preferably square envelopes that may include corner openings. FIGS. 8–11 show other envelopes according to the present invention.

Figures 8, 9, 10, 11:
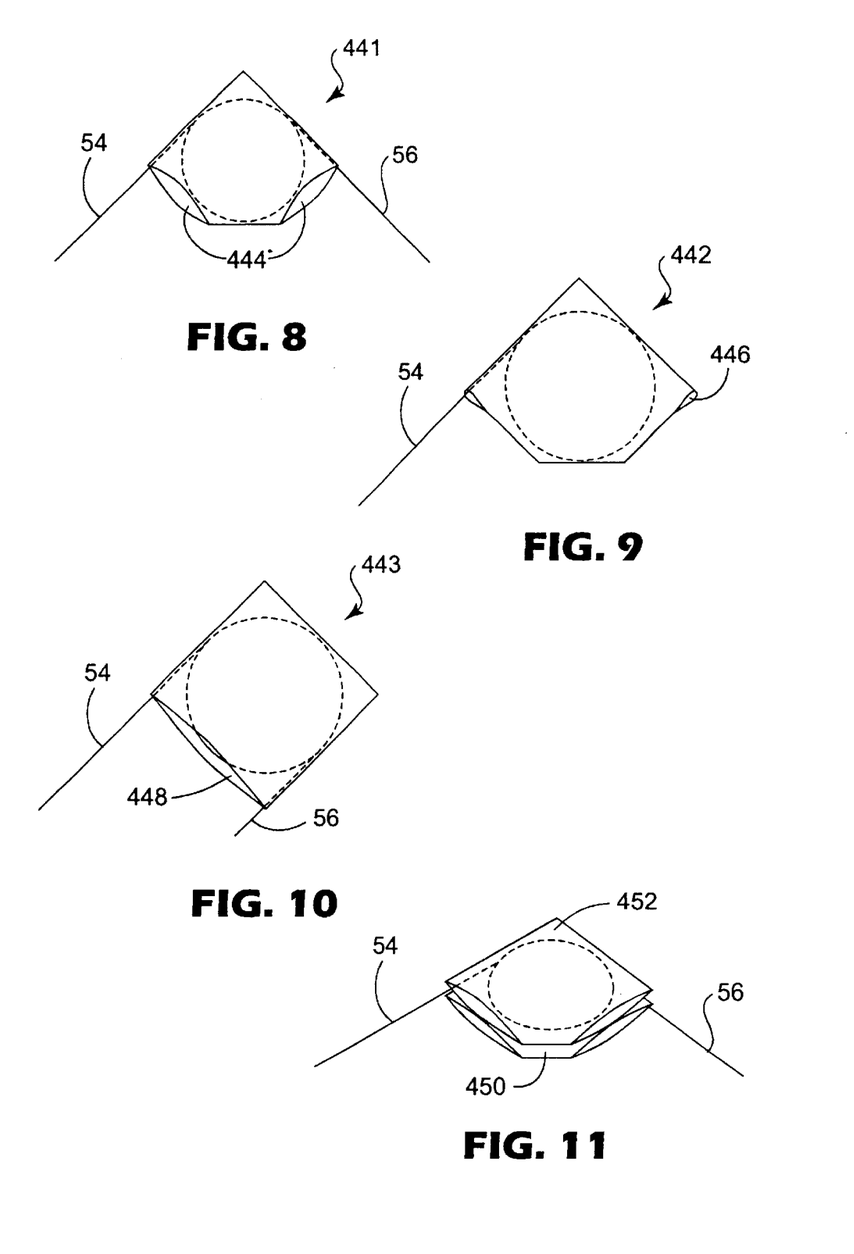
FIG. 8 is a perspective view of an envelope according to the present invention showing filaments extending through edge openings of the envelope.
FIG. 9 is a perspective view showing a filament extended from a corner opening of an envelope.
FIG. 10 provides a perspective view of an envelope having three sealed edges and one open edge.
FIG. 11 is a perspective view showing a layered arrangement of envelopes according to the present invention.

The alternative envelope 441 of FIG. 8 has two open edges 444 that are large enough to allow insertion of a coiled filament into space inside the envelope 441. This also facilitates removal of a coil from an envelope. A coil, represented in the drawings in dotted line form, may be inserted into an envelope to be fully contained, or with a first filament end 54 or, as illustrated in FIG. 8, first 54 and second 56 filament ends extending through one or both open edges 444. Filaments 54, 56 extending from an envelope 441 have suitable alignment for retention in the slits 62 or slots 64 formed in the rails 58, 60 mounted on a carrier (see FIG. 1 and FIG. 2) according to the present invention.

FIG. 9 shows another envelope 442, similar in overall shape to the alternative envelope 441 but including corner openings 446 instead of open edges 444. Corner openings 446 may be placed at one or more corners of the envelope 442. As illustrated, after inserting a coil, an envelope 442 has been sealed around its edges leaving small corner openings 446 at two diagonally opposing corners. The packaged filament is substantially contained within the envelope 442 with a first filament end 54 extending through a corner opening 446. Removal of a coil of filament, packaged as shown using another envelope 442, requires destruction of the envelope 442 unless its edges were releasably sealed using a common form of edge seal, such as structured mating surfaces, re-attach adhesive strips, repositionable sealing tape and the like. Envelopes of the present invention may include a temporary seal that allows their re-use.

FIG. 10 provides an optional envelope 443 that preferably has a square shape. The envelope has three sealed edges and one access opening 448 that allows insertion and removal of a coiled filament. Closure of the sealed edges may result from use of either temporary, releasable seals or permanent seals, as previously discussed. Selection of temporary or permanent sealing depends upon the need for a recyclable or disposable envelope 443. An optional envelope 443 having an access opening may provide full containment for a filament coil or present a first filament end 54 or first 54 and second 56 filament ends outside of the envelope 443, as shown in FIG. 10. Filament ends 54, 56 outside of a containment envelope 443 may be used to connect the filament for evaluation by test equipment. This is particularly beneficial in cases where the coiled filament is an optical fiber that includes a Bragg grating. In this case, the main portion of the coil may remain in the envelope 443 with the first end 54 and the second 56 end available for connecting to a spectrum analyzer. The spectrum analyzer conveniently determines the wavelength of the Bragg grating with the optical fiber coil still in the envelope.

Previous discussion addressed the use of a stacked arrangement of carriers 10 to increase the number of filament coils transportable in a single container. Another way to increase the number of filament coils uses multiple layers of envelopes placed on a single carrier 10. FIG. 10 shows one of several possible layering structures involving a lower envelope 450 supporting an upper envelope 452. Positioning of the layered envelopes 450, 452 facilitates placement of the first filament end 54 in a slit 62 of a resilient retainer 58 and the second filament end 56 in a slot 64 of a second resilient retainer 60. As shown in FIG. 11, only one filament end 54, 56 extends from each of the upper 452 and the lower 450 envelopes. This conforms to the structure of a carrier 10 designed with slits 62 and slots 64 equal to the number of single envelopes mounted on a carrier, i.e. two filament ends 54, 56 for each envelope 44, 441, 442, 443. It should be clear that layered envelopes 450, 452 could have filament ends extending from more than one corner if the number of slits 62 or slots 64 were suitably increased. When the number of filament ends 54, 56 exceeds the number of slits 62 or slots 64 there are no locations for retention of the excess, exposed filament ends. Exposed filament ends are more susceptible to contact and impact damage than those protectively confined to a slit 62 or slot 64.

As required, details of the present invention are disclosed herein; however, it is to be understood that the disclosed embodiments are merely exemplary. Therefore, specific structural and functional details disclosed herein are not to be interpreted as limiting, but merely as a basis for the claims and as a representative basis for teaching one skilled in the art to variously employ the present invention.

What is claimed is:

1. A carrying tray comprising:
    a substantially planar base having a longitudinal axis;
    a first row of projections having spaces therebetween, said first row of projections extending above said base parallel to said longitudinal axis;
    a second row of projections having spaces therebetween, said second row of projections extending above said base parallel to said first row of projections and said longitudinal axis, said carrying tray having a separation between said first row of projections and said second row of projections;

a first tail of resilient material adjacent said first row of projections, said first rail including first retention slits; and a second rail of resilient material adjacent said second row of projections, said second rail including second retention slits.

2. The carrying tray of claim 1, wherein said substantially planar base further has a plurality of recesses formed therein aligned substantially parallel to said longitudinal axis.

3. The carrying tray of claim 1, further including a plurality of rectangular envelopes, each of said envelopes including a first corner opposite a second corner, said plurality of envelopes sized to mount in overlapping relationship on said base with each said first corner located in a said space of said first row of projections, each said second corner being located in a said space of said second row of projections.

4. The carrying tray of claim 1, wherein each said projection of said first row of projections and said second row of projections has a symmetrical cross section.

5. The carrying tray of claim 4, wherein said symmetrical cross section is selected from the group consisting of circular, triangular and square cross sections.

6. A earner for a filament, said carrier comprising:

a base;

at least a first pair of spaced apart projections extending from said base;

at least a second pair of spaced apart projections extending from said base parallel to said at least a first pair of spaced apart projections;

at least one envelope to contain a filament, said at least one envelope sized for retention between said first pair of projections and said second pair of projections, said at least one envelope having a plurality of corners for locating at least one of said corners between each of said first pair of projections and said second pair of projections, said at least one envelope further having at least one opening formed therein adjacent to said at least one of said corners to allow at least one filament end to protrude therethrough;

a first rail of resilient material adjacent said first pair of spaced apart projections; and a second rail of resilient material adjacent said second pair of spaced apart projections, wherein said first rail includes first retention slits and said second rail includes second_retention slits to receive ends of a filament protruding from said at least one of said corners of said at least one envelope.

7. The carrier of claim 6, wherein said resilient material is selected from the group consisting of polymeric elastomers, rubbers, open-cell foams and closed-cell foams.

8. The carrier of claim 6, wherein said carrier for a filament is a carrier for an optical fiber.

9. A carrier for coiled filaments, said carrier comprising:

a base including a first end, a second end, and a first ledge opposite a second ledge;

a raised platform between said first ledge and said second ledge;

at least a first pair of spaced-apart projections adjacent to said first ledge of said base;

at least a second pair of spaced-apart projections adjacent to said second ledge of said base, said second pair of projections in parallel relationship to said first pair of projections;

at least one envelope having an internal space for a coiled filament and including a first corner diagonally opposite a second corner, said first corner and said second corner having at least one opening adjacent thereto such that the ends of a coiled filament extend therethrough, said at least one envelope sized to mount on said raised platform with said first corner located between said at least a first pair of projections, said second corner being located between said at least a second pair of projections;

a first rail of resilient material mounted on said first ledge, said first rail including a plurality of first slits formed therein such that each said first slit receives an end of a coiled filament, extending from said at least one opening adjacent to said first corner, to be retained in a said first slit of said first rail; and a second rail of resilient material mounted on said second ledge, said second rail including a plurality of second slits formed therein such that each said second slit receives an end of a coiled filament, extending from said at least one opening adjacent to said second corner, to be retained in a said second slit of said second rail.

10. The carrier of claim 9, wherein said resilient material is selected from the group consisting of polymeric elastomers, rubbers, open-cell foams and closed-cell foams.

11. A shipping container comprising:

a first carrier;

at least a second carrier mounted on said first carrier to provide a stacked arrangement, said first carrier and said at least a second carrier each comprising:

at least a first pair of spaced apart projections and at least a second pair of spaced apart projections parallel to said at least a first pair of spaced apart projections;

a cover sized to fit over said stacked arrangement; and at least one envelope to contain a coil of a filament, said at least one envelope having opposing corners sized for retention between said first pair of projections and said second pair of projections of each of said first carrier and said at least a second carrier.

12. The shipping container of claim 11, wherein the filament is an optical fiber.

13. A carrying tray comprising:

a substantially planar base having a longitudinal axis, said substantially planar base further having a plurality of recesses formed therein aligned substantially parallel to said longitudinal axis;

a first row of projections having spaces therebetween, said first row of projections extending above said base parallel to said longitudinal axis;

a second row of projections having spaces therebetween, said second row of projections extending above said base parallel to said first row of projections and said longitudinal axis, said carrying tray having a separation between said first row of projections and said second row of projections;

a first rail of resilient material adjacent said first row of projections, said first rail including first retention slits; and a second rail of resilient material adjacent said second row of projections, said second rail including second retention slits.

14. The carrying tray of claim 13, further including a plurality of rectangular envelopes, each of said envelopes including a first corner opposite a second corner, said plurality of envelopes sized to mount in overlapping relationship on said base with each said first corner located in a said space of said first row of projections, each said second corner being located in a said space of said second row of projections.

15. The carrying tray of claim 13, wherein each said projection of said first row of projections and said second row of projections has a symmetrical cross section.

16. The carrying tray of claim 15, wherein said symmetrical cross section is selected from the group consisting of circular, triangular and square cross sections.

* * * * *

UNITED STATES PATENT AND TRADEMARK OFFICE
CERTIFICATE OF CORRECTION

PATENT NO. : 6,651,814 B2
DATED : November 25, 2003
INVENTOR(S) : Higbee, Thomas A.

It is certified that error appears in the above-identified patent and that said Letters Patent is hereby corrected as shown below:

<u>Title page,</u>
Item [56], References Cited, U.S. PATENT DOCUMENTS, please add:
-- 5,887,707   03/1999   Anascavage et al --

FOREIGN PATENT DOCUMENTS, please add:
-- EP   0351202   A2   01/1990
   DE   3306502   A1   08/1984
   DE   3236213   A1   04/1984
   JP   10-300941       11/1998 --

OTHER PUBLICATIONS, please add:
-- Search Report for PCT/US01/21763 --

<u>Column 11,</u>
Line 5, delete "tail" and insert -- rail -- therefor.
Line 28, delete "earner" and insert -- carrier -- therefor.

Signed and Sealed this

Sixth Day of July, 2004

JON W. DUDAS
*Acting Director of the United States Patent and Trademark Office*